(12) United States Patent
Nakagawa et al.

(10) Patent No.: US 7,973,752 B2
(45) Date of Patent: *Jul. 5, 2011

(54) DISPLAY APPARATUS

(75) Inventors: Kiyoshi Nakagawa, Yokohama (JP); Toshihiro Yanagi, Nara (JP); Taketoshi Nakano, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1040 days.

This patent is subject to a terminal disclaimer.

(21) Appl. No.: 11/790,140

(22) Filed: Apr. 24, 2007

(65) Prior Publication Data

US 2007/0195039 A1    Aug. 23, 2007

Related U.S. Application Data

(63) Continuation of application No. 10/670,237, filed on Sep. 26, 2003, now Pat. No. 7,262,756.

(30) Foreign Application Priority Data

Nov. 6, 2002   (JP) ................................ 2002-322229

(51) Int. Cl.
    *G09G 3/36*   (2006.01)
(52) U.S. Cl. ............. 345/89; 345/87; 345/204; 345/690
(58) Field of Classification Search ............ 345/87–100, 345/204, 690
    See application file for complete search history.

(56) References Cited

U.S. PATENT DOCUMENTS

| | | | |
|---|---|---|---|
| 5,949,194 A | 9/1999 | Kawakami et al. | |
| 6,611,249 B1 | 8/2003 | Evanicky et al. | |
| 6,727,874 B2 | 4/2004 | Okuzono | |
| 6,744,415 B2 | 6/2004 | Waterman et al. | |
| 6,768,481 B2 | 7/2004 | Ozawa et al. | |
| 7,023,458 B2 | 4/2006 | Kudo et al. | |
| 7,262,756 B2 | 8/2007 | Nakagawa et al. | |
| 2002/0003521 A1 | 1/2002 | Matsueda et al. | |
| 2002/0011979 A1 | 1/2002 | Nitta et al. | |
| 2002/0036624 A1 | 3/2002 | Ohta et al. | |
| 2002/0060657 A1 | 5/2002 | Matsueda et al. | |

FOREIGN PATENT DOCUMENTS

JP   38989/1998   2/1988

(Continued)

OTHER PUBLICATIONS

JP2002-41004 corresponds to US 2002/0011979 listed above.

(Continued)

*Primary Examiner* — Kimnhung Nguyen
(74) *Attorney, Agent, or Firm* — Nixon & Vanderhye P.C.

(57) ABSTRACT

The present invention is so arranged as to include (a) gradation reference potential generating means including a group of output terminals whose voltages are determined in accordance with a voltage division ratio of one ladder resistor, so as to output gradation reference potentials, for example, of 1024, which is a 16 multiple of a required 64-gradations; (b) output terminal designating means including a memory for designating, among from the output terminals, an output terminal for each of the 64-gradations required, in accordance with the display modes; and (c) selecting means for selecting an output terminal that corresponds to an input gradation signal, among from the output terminals designated by the output terminal designating section, and for applying a voltage via the thus selected output terminal to a display screen. With this arrangement, it is possible to attain very similar gradient signal-brightness characteristics for respective display modes with high accuracy, in order to prevent a gradient display from being changed due to switchover of the display modes.

3 Claims, 15 Drawing Sheets

FOREIGN PATENT DOCUMENTS

| | | |
|---|---|---|
| JP | 05-019725 | 1/1993 |
| JP | 9-305145 | 11/1997 |
| JP | 10-062743 | 3/1998 |
| JP | 333648/1998 | 12/1998 |
| JP | 11-264855 | 9/1999 |
| JP | 2000-193936 | 7/2000 |
| JP | 193936/2000 | 7/2000 |
| JP | 2000-227608 A | 8/2000 |
| JP | 2001-22325 A | 1/2001 |
| KR | 2002-0020994 A | 3/2002 |
| WO | WO 98/48317 | 10/1998 |

OTHER PUBLICATIONS

U.S. Appl. No. 10/670,237, filed Sep. 26, 2003.
Taiwanese Office Action and English translation thereof mailed Jul. 4, 2005 in corresponding Taiwanese application No. 092127424.
Korean Office Action and English translation thereof mailed Aug. 23, 2005 in corresponding Korean application No. 10-2003-68752.

|  | REFLECTION METHOD | TRANSMISSION METHOD |
| --- | --- | --- |
| V0 | 0/1024 | 0/1024 |
| V1 | 5/1024 | 8/1024 |
| V2 | 15/1024 | 25/1024 |
| V10 | 162/1024 | 220/1024 |
| V32 | 467/1024 | 500/1024 |
| V63 | 901/1024 | 910/1024 |

| REFLECTION METHOD | TRANSMISSION METHOD |
|---|---|
| R1 | R1' |
| R2 | R2' |
| R3 | R3' |
| R4 | R4' |

DISPLAY APPARATUS

This application is a Continuation of Ser. No. 10/670,237, filed Sep. 26, 2003, now U.S. Pat. No. 7,262,756 the entire content of which is hereby incorporated herein by reference in this application.

FIELD OF THE INVENTION

The present invention relates to a display apparatus such as a semi-transmissive liquid crystal display apparatus and the like, which performs both reflective display and transmissive display, a display mode of the reflective display and a display mode of the transmissive display being different in relationship between an applied voltage and transmissivity or relationship between the applied voltage and reflectivity.

BACKGROUND OF THE INVENTION

In general, it is preferable for display apparatuses such as liquid crystal display apparatuses (LCDs) that the display apparatuses have such a gradient characteristic that output brightness is liner with respect to an input gradation signal. Here, a characteristic represented by a relationship between an input gradation signal value and the output brightness is referred to as γ characteristic. The γ characteristic specifically refers to a proportional change of brightness L of a display apparatus with respect to γ-th power of an input gradation signal value E that is inputted to the display apparatus. Thus, the γ characteristic is represented by a formula: $L=KE^\gamma$ (γ=2.2 to 3 generally; K is constant).

As described above, in the most of the display apparatuses, the output brightness is not linear with respect to the input gradation signal, that is, the most of the display apparatuses have the γ characteristic. Thus, in the most of the display apparatuses, it is impossible to attain correct gradient display without special treatment.

Therefore, it is necessary to carry out correction in the display apparatuses in advance by using 1/γ power of the input gradation signal value E, which is shown in FIG. 7 as "reverse γ character of general image $(E^{1/\gamma})$". Hereby, it is possible to perform correct gradient display as shown in FIG. 7 as "correct γ characteristic $(E^\gamma)$". This correction is referred to as γ correction. By carrying out the γ correction, it is possible to attain the linear relationship of the output brightness with respect to the input gradation signal, that is, $L=KE$ (K is constant), as the "correct γ characteristic $(E^\gamma)$".

Incidentally, in order to attain the γ characteristic corresponding to the γ reverse characteristic, a γ correction circuit of the display apparatus as shown in FIG. 8 is used. The γ correction circuit realizes suitable sixty four gradations by using each selector to select one of sixty four output terminals, which are sectioned as sixty four stages. By doing this, the correct gradient display is attained. Note that the γ correction circuit is, as shown in FIG. 9, built in a source driver 71 of an LCD 70.

In the conventional LCD, it is impossible to change a most suitable value of the γ correction during operation of the LCD, after the most suitable value is once set. In case where a display mode is not switched over, there is no problem with this arrangement.

However, a semi-transmissive LCD is on the market recently. The semi-transmissive LCD takes advantages of both of the reflection method (referred to as "mode 1") and the transmission method (referred to as "mode 2"). In the reflection method, outside light is used while a backlight is turned off. Thus, the reflection method is used in a bright place, for low power consumption. In a dark place, used is the transmission method in which the backlight is used as in a conventional method.

In the semi-transmissive LCD, the same image looks differently when the semi-transmissive LCD is switched over from the transmission method to the reflection method, because gradation-brightness characteristics of the transmission method and the reflection method are completely dissimilar to each other, as shown in FIG. 10. This is because applied voltage (V)-transmissivity (T) characteristics of the transmission method and the reflection method are dissimilar to each other due to differences between the transmission method and the reflection method in terms of the transmissivity and the applied voltage, as shown in FIG. 11. It should be noted that FIG. 11 only discuss on the applied voltage (V)-transmissivity (T) characteristics, but the same is true for the applied voltage (V)-reflectivity characteristics.

Moreover, there is a case where it is desirable that respective display modes perform different gradation displays, because, if there is only one gradation setting, a user may feel strange in the display.

In view of this, as shown in FIG. 12, it is so arranged that a plurality of characteristic curves of gradation-voltage application characteristic of a source driver are provided in advance and the characteristic curves to be used are switched over in accordance with the switchover of the display modes. In FIG. 12, there are only two settings. Of course, however, there may be provided more than two settings, so that one of the settings can be selected for each display mode. With this arrangement, as shown in FIG. 13, it is possible to attain complete matching of the gradation-brightness characteristics between the transmission method and the reflection method.

As a conventional display apparatus capable of changing gradation levels according to which display mode is used, for example, Japanese Publication for Unexamined Patent Application "Tokukai No. 2000-193936 (published on Jul. 14, 2000) discloses a display apparatus including two types of reference potential generating circuits 81 and 82, as shown in FIG. 14. By selecting one of the reference potential generating circuits 81 and 82 in accordance with reflection/transmission judging signal, voltage (V)-transmissivity (T) characteristics of the "transmission" and "reflection" are matched (become very similar) for each gradation, while the applied voltage (V)-reflectivity characteristics of the "transmission" and "reflection" are also matched (become very similar) for each gradation.

Moreover, in view of a problem that γ correction coefficients cannot be switched over according to which mode is used, because a circuit generating a reference voltage for a γ correction circuit has such an arrangement voltages of the circuit are determined in accordance with a voltage division ratio (a ratio of voltage division using resistors), Japanese Publication for Unexamined Patent Application "Tokukaihei No. 10-333648 (published on Dec. 18, 1998) and Japanese Publication for Unexamined Patent Application "Tokukaisho No. 63-38989 (published on Feb. 19, 1988) disclose arrangements in which information regarding a reference voltage of a γ correction circuit 90 is stored in a memory 91, so that reference voltages V1 to V10 are generated by retrieving the information and performing D/A (from digital to analog) conversion of the thus retrieved information. With this arrangement, it is possible to easily attain a γ correction coefficient arbitrarily.

However, in the conventional display apparatus disclosed in Japanese Publication for Unexamined Patent Application "Tokukai No. 2000-193936 (published on Jul. 14, 2000), it is impossible to reset γ correction values for the respective display modes once the γ correction values are once set. Thus, it is impossible to switch the γ correction values when the display modes are switched over, so that the display modes are performed with the most suitable γ correction values. Thus, it is a problem that the respective display mode cannot have very similar gradation-brightness characteristics with high accuracy.

Moreover, in Japanese Publication for Unexamined Patent Application "Tokukaihei No. 10-333648 (published on Dec. 18, 1998) and Japanese Publication for Unexamined Patent Application "Tokukaisho No. 63-38989 (published on Feb. 19, 1988), gradation correction voltages can be switched over only discretely. Thus, it is necessary to have a large number of input points of the gradation correction voltages for attaining smooth switchover of the gradation characteristics. As a result, this art also has the problem that the respective display mode cannot have very similar gradation-brightness characteristics with high accuracy.

SUMMARY OF THE INVENTION

The present invention, which is contrived to solve the aforementioned problems associated with the related arts, has an object to provide a display apparatus capable of attaining very similar gradient signal-brightness characteristics for respective display modes with high accuracy, in order to prevent a gradient display from being changed due to switchover of the display modes.

In order to attain the aforementioned object, a display apparatus of semi-transmissive type (semi-transmissive display apparatus) of the present invention for performing both reflective display and transmissive display, a display mode of the reflective display and a display mode of the transmissive display being different in relationship between an applied voltage and transmissivity or relationship between the applied voltage and reflectivity, is so arranged as to include (a) a gradation reference potential generating section including two series of two variable resistors and a ladder resistor located between the two variable resistors, the ladder resister outputting gradation reference potentials of a required number of gradation levels, and each of the series dividing a power source voltage, the gradation reference potential generating section including a memory for storing therein resistance value setting data for each display mode, the resistance value setting data being for setting resistance values of the variable resistors.

With this arrangement, the gradation reference potential generating section is provided with two series of two variable resistors and a ladder resistor located between the two variable resistors, the ladder resister outputting gradation reference potentials of a required number of gradation levels, each of the series dividing a power source voltage. Further, the gradation reference potential generating section including a memory for storing therein resistance value setting data for each display mode, the resistance value setting data being for setting resistance values of the variable resistors. Thus, the resistance values of the variable resistors are set in accordance with the resistance value setting data stored in the memory. Therefore, by switching over the resistance value setting data stored, it is possible to substantially attain arbitrary output of the gradation reference potentials.

Moreover, a display apparatus of semi-transmissive type of the present invention for performing both reflective display and transmissive display, a display mode of the reflective display and a display mode of the transmissive display being different in relationship between an applied voltage and transmissivity or relationship between the applied voltage and reflectivity, is so arranged as to include (a) a gradation reference potential generating section including a group of output terminals whose voltages are determined in accordance with a voltage division ratio of one ladder resistor, so as to output gradation reference potentials of a number greater than a required number of gradations; (b) an output terminal designating section including a memory for designating, among from the output terminals, an output terminal for each of the gradation of the required number, in accordance with the display modes; and (c) a selecting section for selecting an output terminal that corresponds to an input gradation signal, among from the output terminals designated by the output terminal designating section, and for applying a voltage via the thus selected output terminal to a display screen.

According to the above invention, the gradation reference potential generating section is provided with the group of output terminals whose voltages are determined in accordance with a voltage division ratio of one ladder resistor, so as to output gradation reference potentials of a number greater than a required number of gradations.

Thus, only one ladder resistor is provided in this arrangement. Therefore, the size of the gradation reference potential generating section is not greater than in a case where a plurality of ladder resistors are provided.

Moreover, the number of the output terminals in the group is greater than the required number of the gradations, in order to be able to supply the gradation reference potentials of the number greater than the required number of gradations (gradation levels). Therefore, outputted are the gradation reference potentials of more finely divided gradations levels than the gradations (gradation levels) required. By selecting the gradation reference potentials among from the gradation reference potentials of such a large number, it is possible to attain accurate γ correction.

Moreover, the output terminal designating section, which includes a memory, designates the output terminals that are suitable for the display modes, respectively for each of the gradation levels (gradations) of the required number. Further, the selector selects, among from the output terminals thus designated by the output terminal designating section, that output terminal which corresponds to the input gradation signal, and applies a voltage via the thus selected output terminal to the display panel.

Therefore, the display apparatus is provided with, for example, a non-volatile memory that is accessible via the command interface, so as to store in the non-volatile memory the γ correction values that are respectively suitable for the plural display modes of the display apparatus.

As a result, correct gradation display is attained, and it becomes possible to improve the quality of the display image regardless of whether the display is performed indoors or outdoors.

Therefore, it is possible to provide a display apparatus capable of attaining very similar gradient signal-brightness characteristics for respective display modes with high accuracy, in order to prevent a gradient display from being changed due to switchover of the display modes.

For a fuller understanding of the nature and advantages of the invention, reference should be made to the ensuing detailed description taken in conjunction with the accompanying drawings.

DESCRIPTION OF THE EMBODIMENTS

Described below is one embodiment of the present invention, with reference to FIG. 1(a) to FIG. 6. The present embodiment discusses an LCD as a display apparatus. However, it should be noted that the display apparatus is not limited to such LCD, and may be any other display apparatus in which reflective display and transmissive display are different in relationship between an applied voltage and transmissivity, or relationship between the applied voltage and reflectivity.

Figure 1:
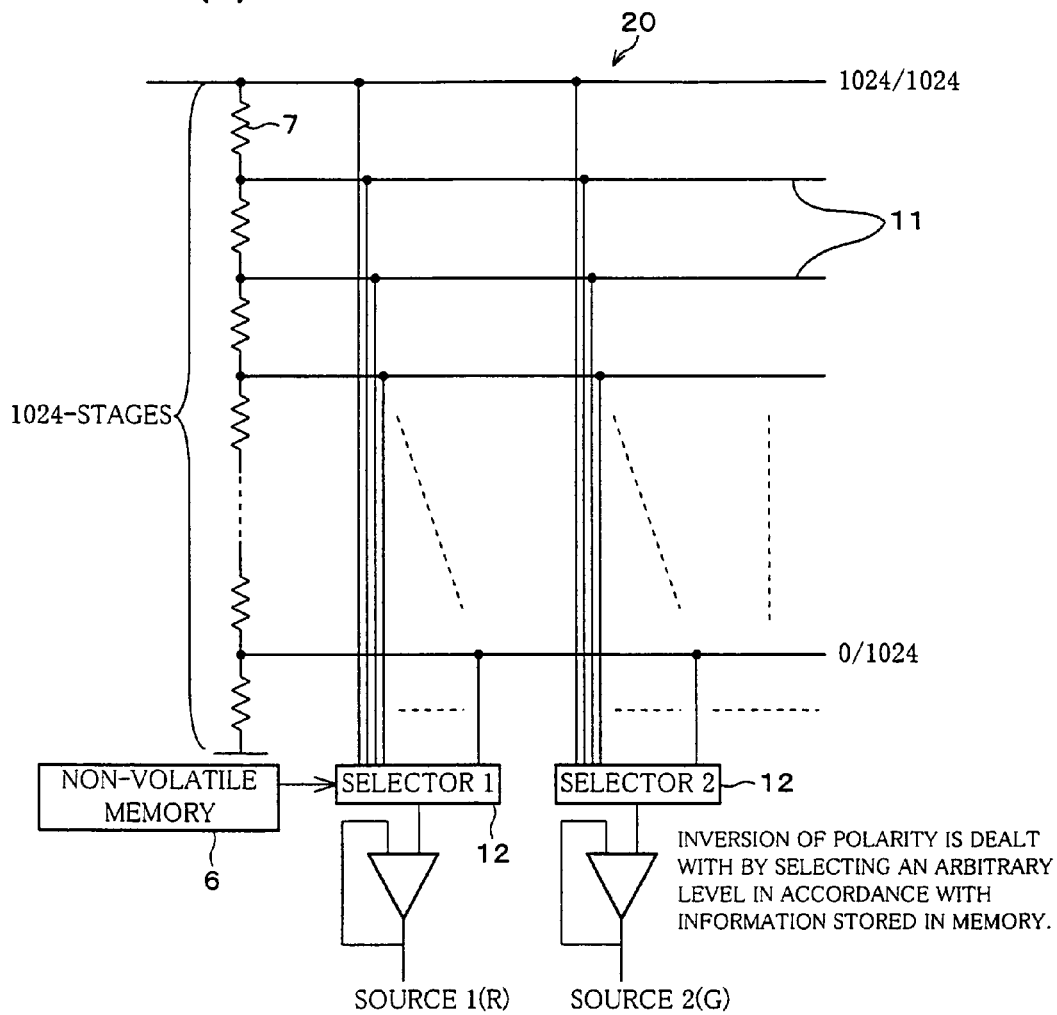
FIG. 1(a) is a block diagram illustrating an essential part of a gradient reference potential generating circuit of one embodiment of an LCD of the present invention.
FIG. 1(b) is an explanatory view illustrating data stored in a non-volatile memory of the LCD.
Figure 2:
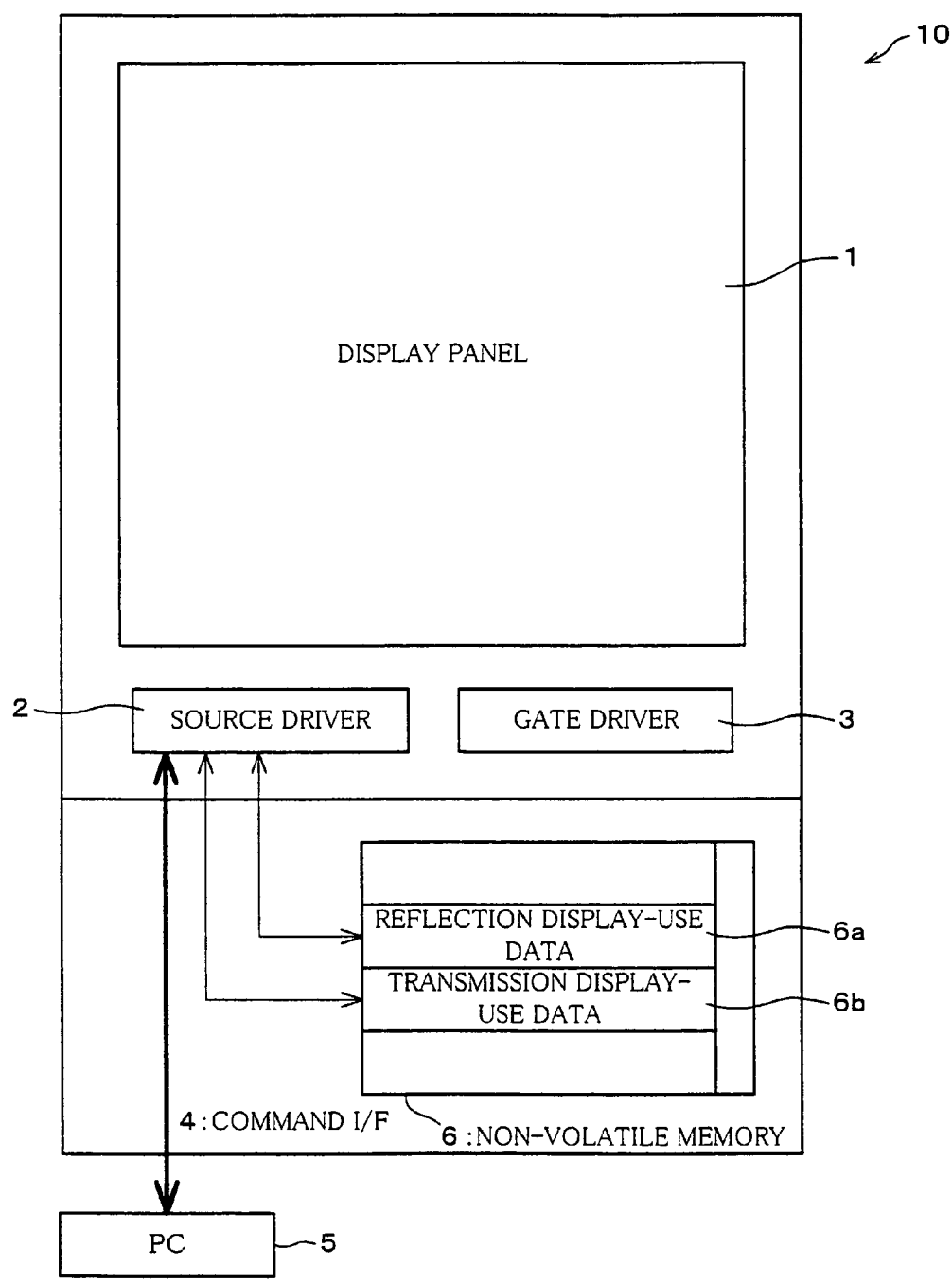
FIG. 2 is a block diagram schematically illustrating an overall structure of the LCD.
Figure 3:
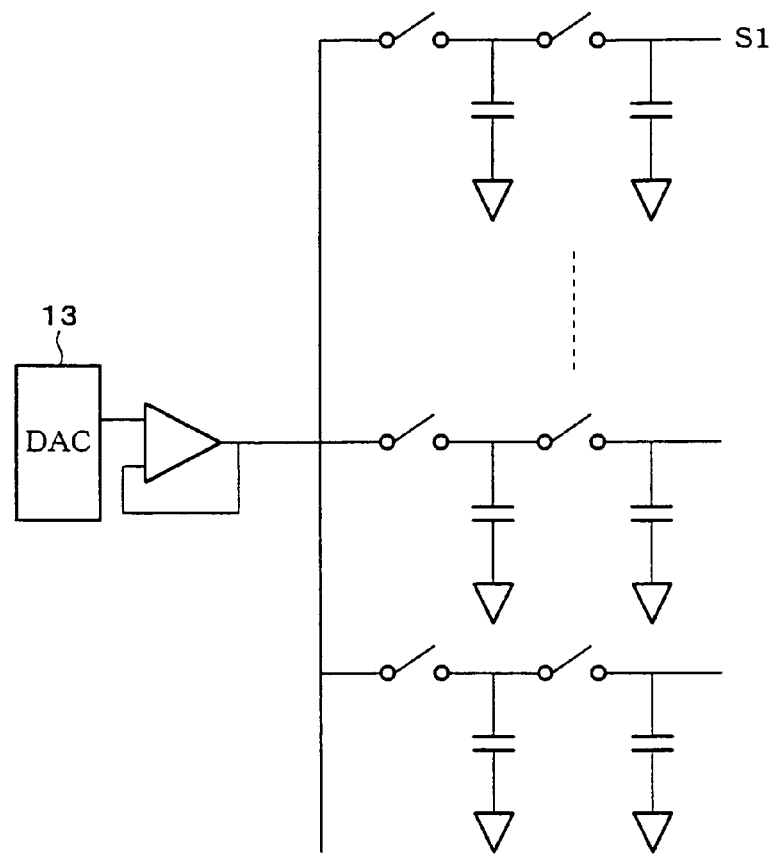
FIG. 3(a) is a block diagram illustrating a gradient reference potential generating circuit for point-by-point display.
FIG. 3(b) is a graph showing an output potential of a source line in one horizontal period.
Figure 3:
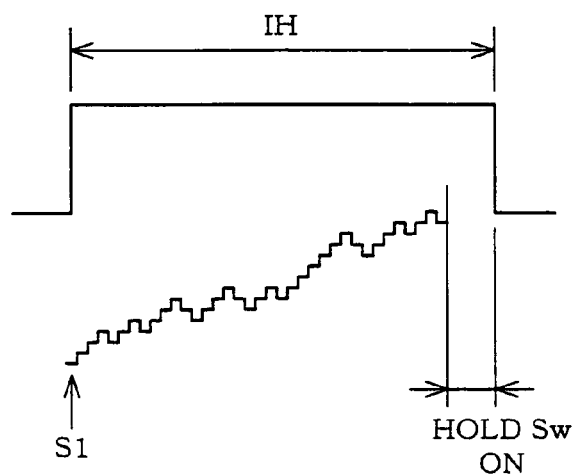
Figure 4:
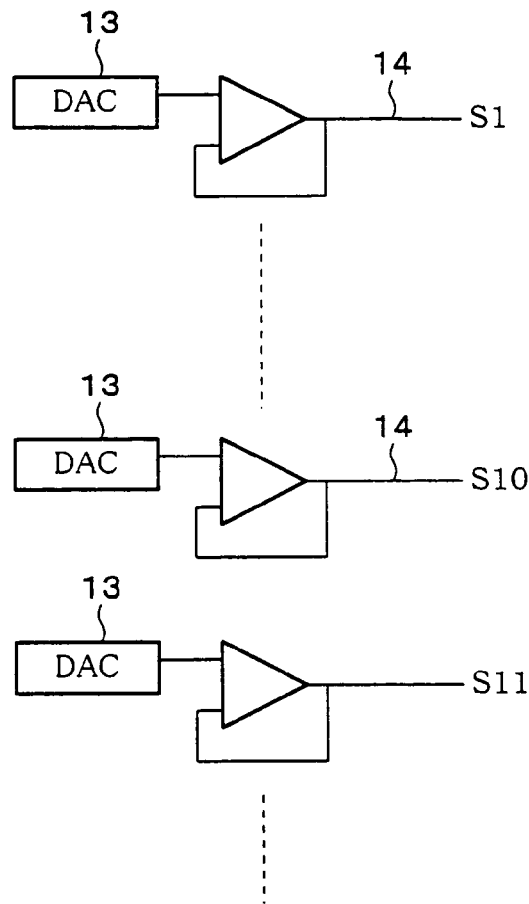
FIG. 4(a) is a block diagram illustrating a gradient reference potential generating circuit for line-by-line display.
FIG. 4(b) is a graph showing an output potential of a source line in one horizontal period.
Figure 4:
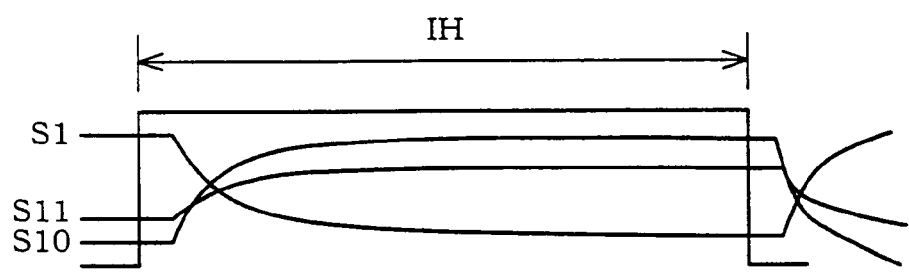
Figure 5:
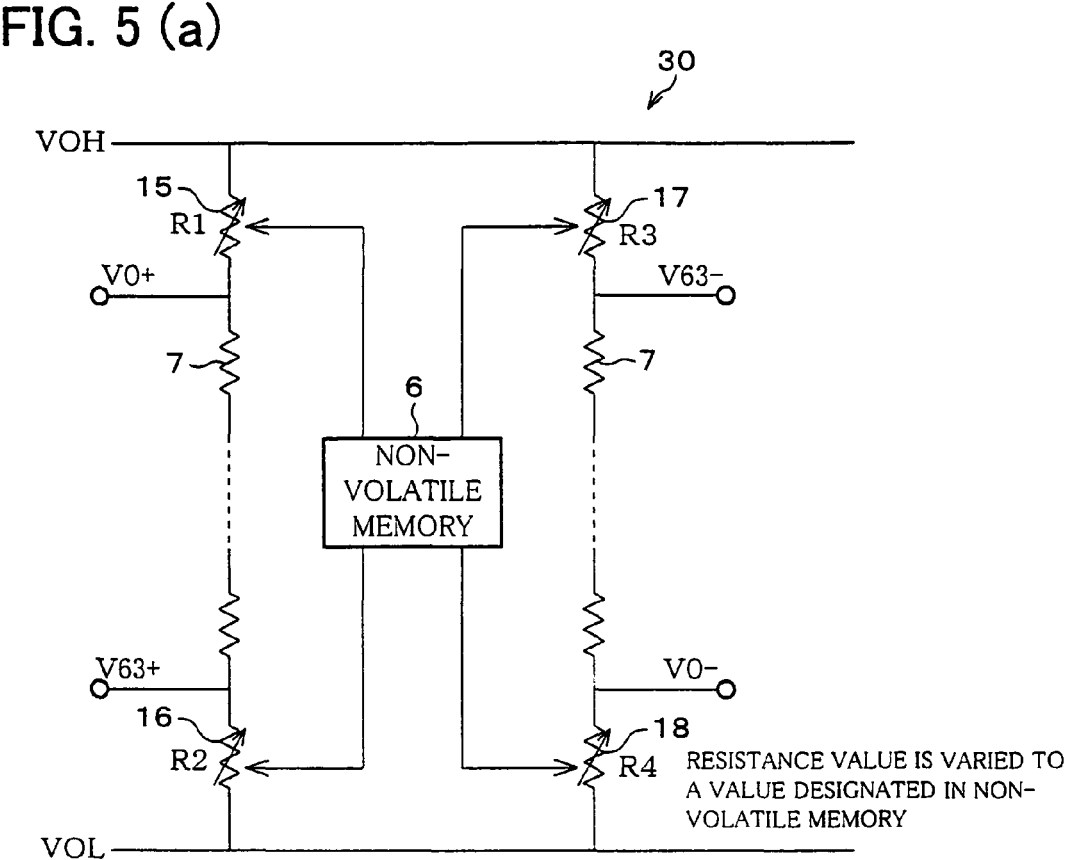
FIG. 5(a) is a block diagram illustrating an essential part of a gradient reference potential generating circuit of another embodiment of the LCD of the present invention.
FIG. 5(b) is an explanatory view illustrating data stored in a non-volatile memory of the LCD.

An LCD 10 as the display apparatus of the present embodiment is, as shown in FIG. 2, provided with a display panel 1 as a display screen, and a source driver 2 and a gate driver 3. The source driver 2 and the gate driver 3 are for driving the display panel 1. The source driver 2 is connected with a personal computer (PC) 5 via a command interface (I/F) 4, so that display panel 1 performs display in accordance with instructions given from the PC 5.

The LCD 10 is of the semi-transmissive type, which is capable of displaying in two modes, namely a reflection method (referred to as "mode 1"), and a transmission method (referred to as "mode 2"). When the LCD 10 performs display in the reflection method, a backlight (not shown) is turned OFF and outside light is used for the display. When the LCD 10 performs display in a dark place, the display is performed in the transmission method by using the backlight.

In the present embodiment, the LCD 10 is provided with a non-volatile memory 6 as output terminal designating means. The non-volatile memory 6 stores therein reflective display-use data 6a and transmissive display-use data 6b.

The non-volatile memory 6 is connected to the source driver 2, so that the reflective display-use data 6a and the transmissive display-use data 6b stored in the non-volatile memory 6 can be used by the source driver 2. In other words, the non-volatile memory 6 is accessible via the command interface 4 from the PC 5, for example. Note that the command interface 4 is a CPU (Central Processing Unit) bus interface of n bits (where n is 8, 9, 16, and the like). A typical example of the command interface 4 is a CPU (80-type CPU) compatible with the 8080 CPU.

In the reflective display-use data 6a and the transmissive display-use data 6b of the non-volatile memory 6, contained are γ correction values respectively for the display modes of the LCD 10.

With this arrangement, optimum values of the reflective display-use data 6a and the transmissive display-use data 6b are switched over in accordance with a command, in synchronism with the switchover of the display modes, such as from the mode 1 to mode 2, or vice versa. In this way, it is possible to easily correct the reflective display-use data 6a and the transmissive display-use data 6b to their optimum values even while the LCD 10 is being operated. As a result, correct gradation display is attained so that quality of display image can be improved regardless of whether the display is performed indoors or outdoors.

Moreover, with the arrangement in which the non-volatile memory 6 is provided, it is possible to easily set γ characteristic to its optimum value without having a complicate circuit, even if the γ characteristic should be switched over in order to use a display mode other than the display modes described above. Thus, the LCD 10 can have a very practical arrangement.

Here, the following discusses a structure and a method of the LCD 10 for performing optimum γ correction in each display mode as described above.

To begin with, as shown in FIGS. 1(a) and 1(b), a gradation reference potential generating circuit 20 as gradation reference potential generating means of the present embodiment is provided with a group of output terminals 11. Voltages of the output terminals 11 are determined in accordance with a voltage division ratio of a ladder resistor 7, so as to output gradation reference potentials respectively for gradations of a certain multiple of the required number of gradations, 64, for example, a 16 multiple of 64-gradations required.

Moreover, each output terminal 11 in the group is connected with the selectors 12 as selection means. The selectors 12 are connected with the non-volatile memory 6 as output terminal designating means.

The non-volatile memory 6 designates the output terminals 11 for each of 64-gradation levels that are required by the display modes. On the other hand, the selectors 12 selects, from among the output terminals 11 designated by the non-volatile memory 6, the output terminal 11 that corresponds to an input gradation signal, and applies a voltage via the thus selected output terminal 11 to a display panel 1.

In short, in the present embodiment, adopted as one method of the γ correction is a method using a color palette as shown in FIGS. 1(a) and 1(b).

Specifically, in order to realize, for example, 64-gradations, the gradation reference potential generating circuit 20 of the present embodiment is so arranged as to have gradation segments that outnumber the 64-gradations, so that sixty four of the gradation segments can be selected arbitrarily. Note that the present embodiment discuses the case where the required gradation number is sixty four. However, the present invention is not limited to this.

More specifically, as shown in FIG. 1(a), by using the selectors 12 corresponding thereto, sixty four output terminals 11 are selected arbitrarily among from 1024-output terminals respectively in one thousand and twenty four gradation segments. In this way, most suitable 64-gradations are realized. In this case, as to selection of sixty four output terminals 11, the output terminals that are suitable for the reflection method or the transmission method are selected, in accordance with data stored in the non-volatile memory 6. In the present embodiment, the gradation reference potential generating circuit 20 is provided with 1024-output terminals 11, while 64-gradations are required. However, the present invention is not limited to this, provided that the gradation reference potential generating circuit 20 outputs gradation reference potentials of an N multiple of the required number of gradations (where N is an integer not less than 2). As described above, the present embodiment is so arranged that N=1024/64=16. For higher accuracy in the γ correction, a larger N is preferable.

In this method, in case of a point-by-point method in which the display is carried out per one dot, as shown in FIGS. 3(a) and 3(b), the output terminals 11 for the 1024-gradations (that is, the one thousand and twenty four output terminals 11) are switched over by using a sophisticated D/A (digital-to-analog) converter (DAC) 13.

However, as shown in FIGS. 4(a) and 4(b), in case of a line-by-line method in which the display is carried out every one horizontal period (1 H), it is necessary to have D/A converters (DAC) 13 respectively for source lines 14. Thus, it is necessary to have the output terminals of the number of the source line×1024-gradations (1024 multiple of the number of source line). It is difficult to provide such a large number of the output terminals 11 in the circuit. Thus, this arrangement is not so practical.

FIG. 5(a) shows a little bit more practical arrangement. In this arrangement, a gradation reference potential generating circuit 30 as the gradation reference potential generating means is provided with, one side thereof, two variable resistors 15 and 16 and a ladder resistor 7 located therebetween, while, on the other side, the gradation reference potential generating circuit 30 is provided with two variable resistors 17 and 18, and a ladder resistor 7 located therebetween, so as to divide a power source voltage (VOH-VOL). The ladder resistors 7 respectively output gradation reference potentials. The number of the gradation reference potentials outputted by each of the ladder resistors corresponds to the required number of the gradation levels (gradations).

Specifically, the two sets of the ladder resistors 7 are used for generating positive gradation reference potentials and negative gradation reference potentials. Therefore, V0+ to V63+, which are the positive gradation reference potentials, are drawn out from the ladder resistor 7 located on the left hand side in FIG. 5(a). Meanwhile, V63− to V0−, which are the negative gradation reference potentials, are drawn out from the ladder resistor 7 located on the right hand side in FIG. 5(a).

Moreover, the gradation reference potential generating circuit 30 is provided with a non-volatile memory 6 storing therein data for setting resistance values respectively for display modes, so as to set resistance values R1 to R4 of the respective variable resistors 15 to 18.

The gradation reference potential generating circuit 30 is provided with the variable resistors 15 to 18. By changing the resistance values of the variable resistors 15 to 18, the voltages of the V0 to V63 are varied. As to how the resistance values of the variable resistors 15 to 18 are changed, in case of the reflection method the resistance values R1, R2, R3, and R4 are selected in the non-volatile memory 6, as shown in FIG. 5(b). On the other hand, in case of the transmission method the resistance values R1', R2', R3', and R4' are selected in the non-volatile memory 6, as shown in FIG. 5(b).

Figure 6:
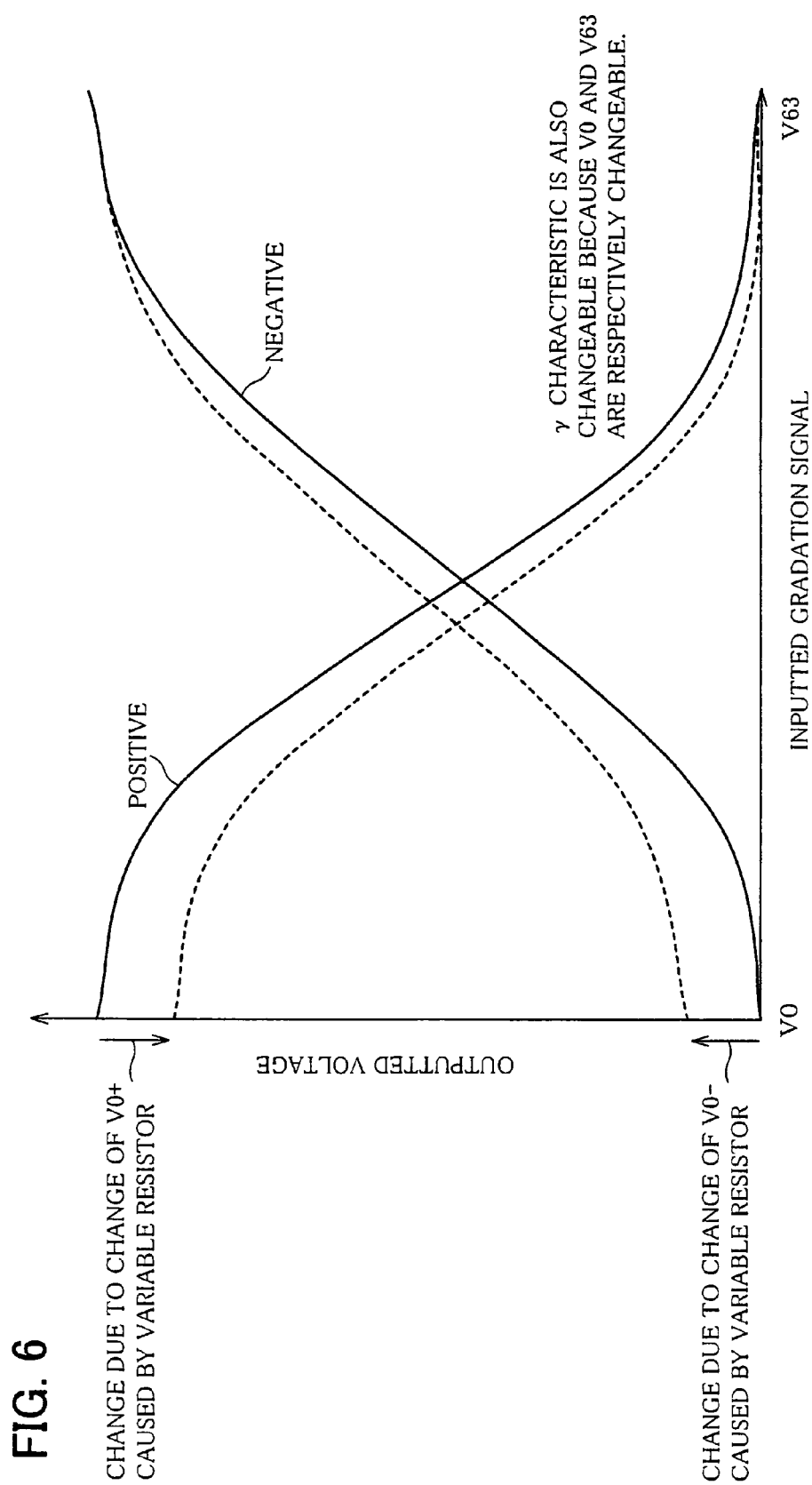
FIG. 6 is a graph showing relationship between an input gradation signal and an output voltage.
Figure 7:
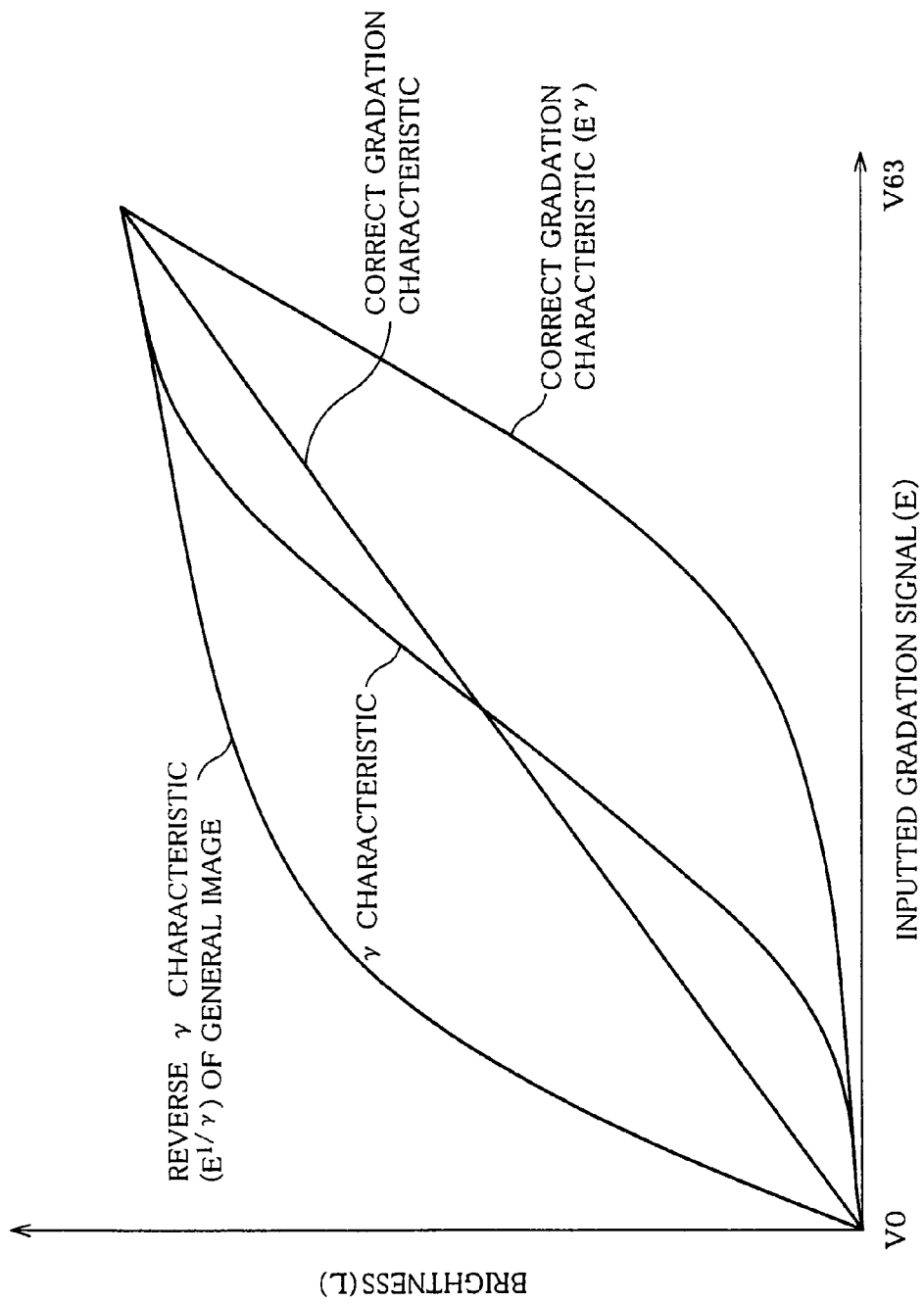
FIG. 7 is a graph showing relationship between the input gradation signal and brightness.
Figure 8:
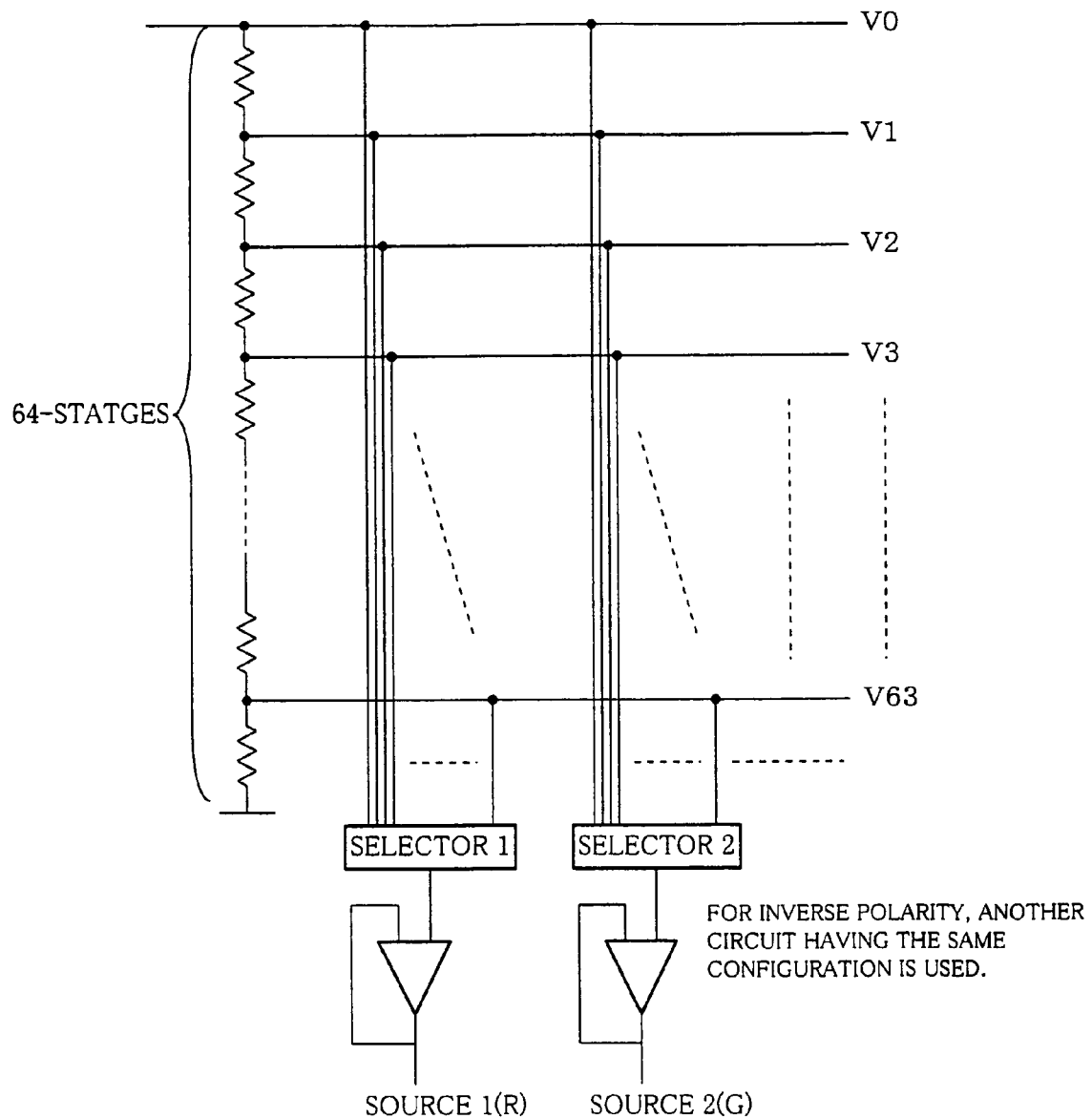
FIG. 8 is a block diagram illustrating an arrangement of a γ correction circuit of a conventional LCD.
Figure 9:
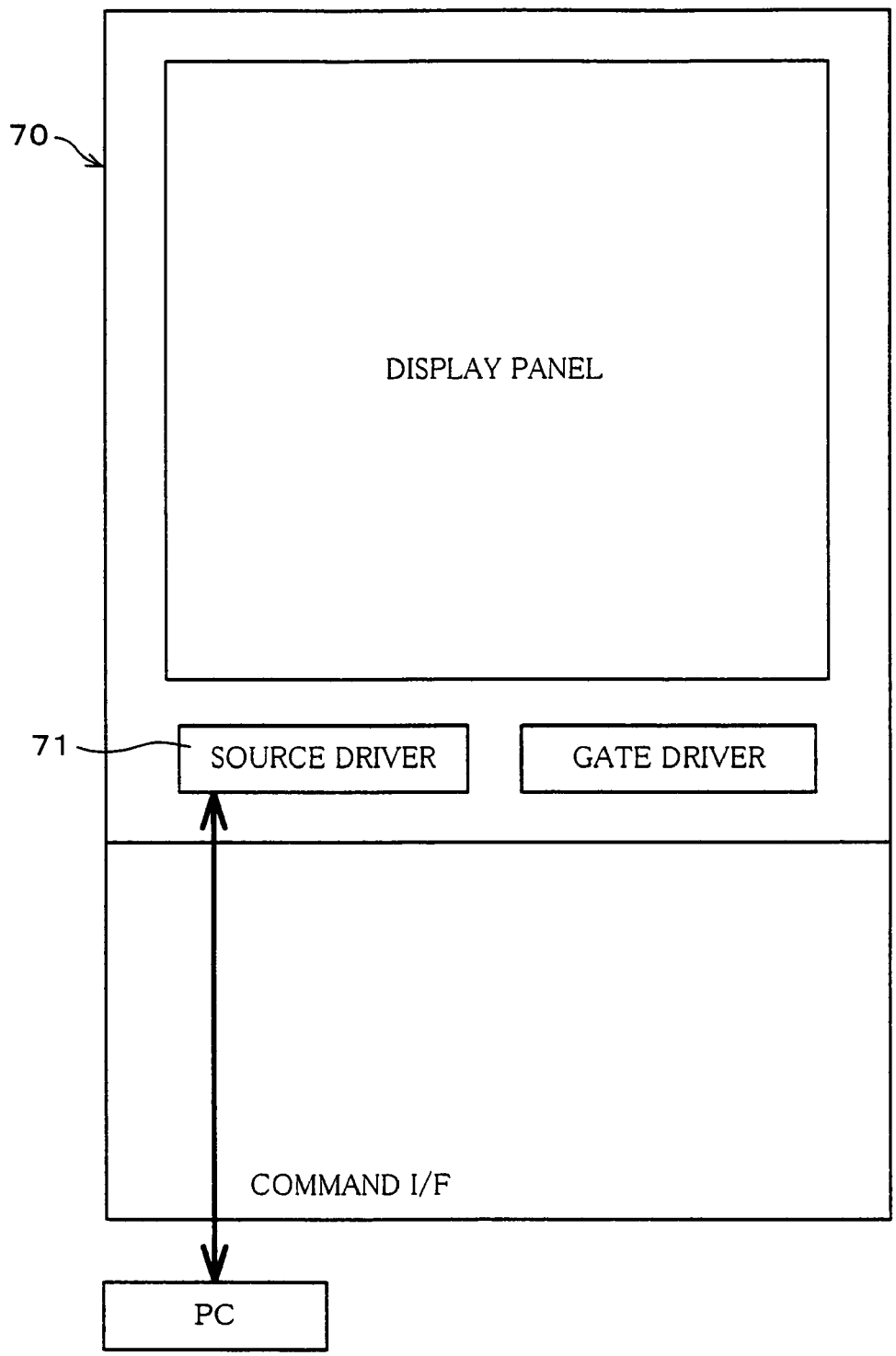
FIG. 9 is a block diagram schematically illustrating an overall arrangement of the conventional LCD
Figure 10:
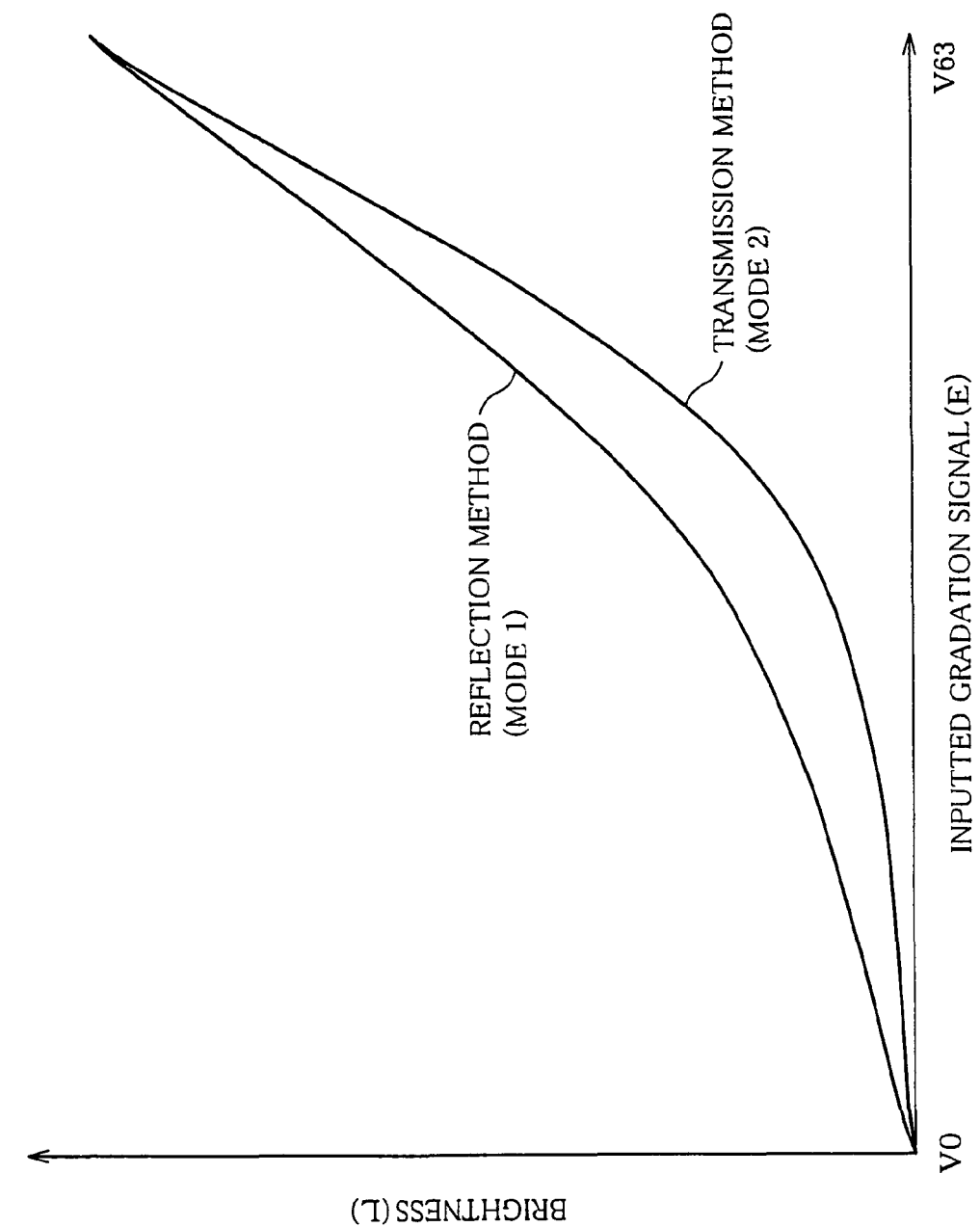
FIG. 10 is a graph showing relationship between an input gradation signal and brightness of the transmission method and the reflection method in the conventional LCD.
Figure 11:
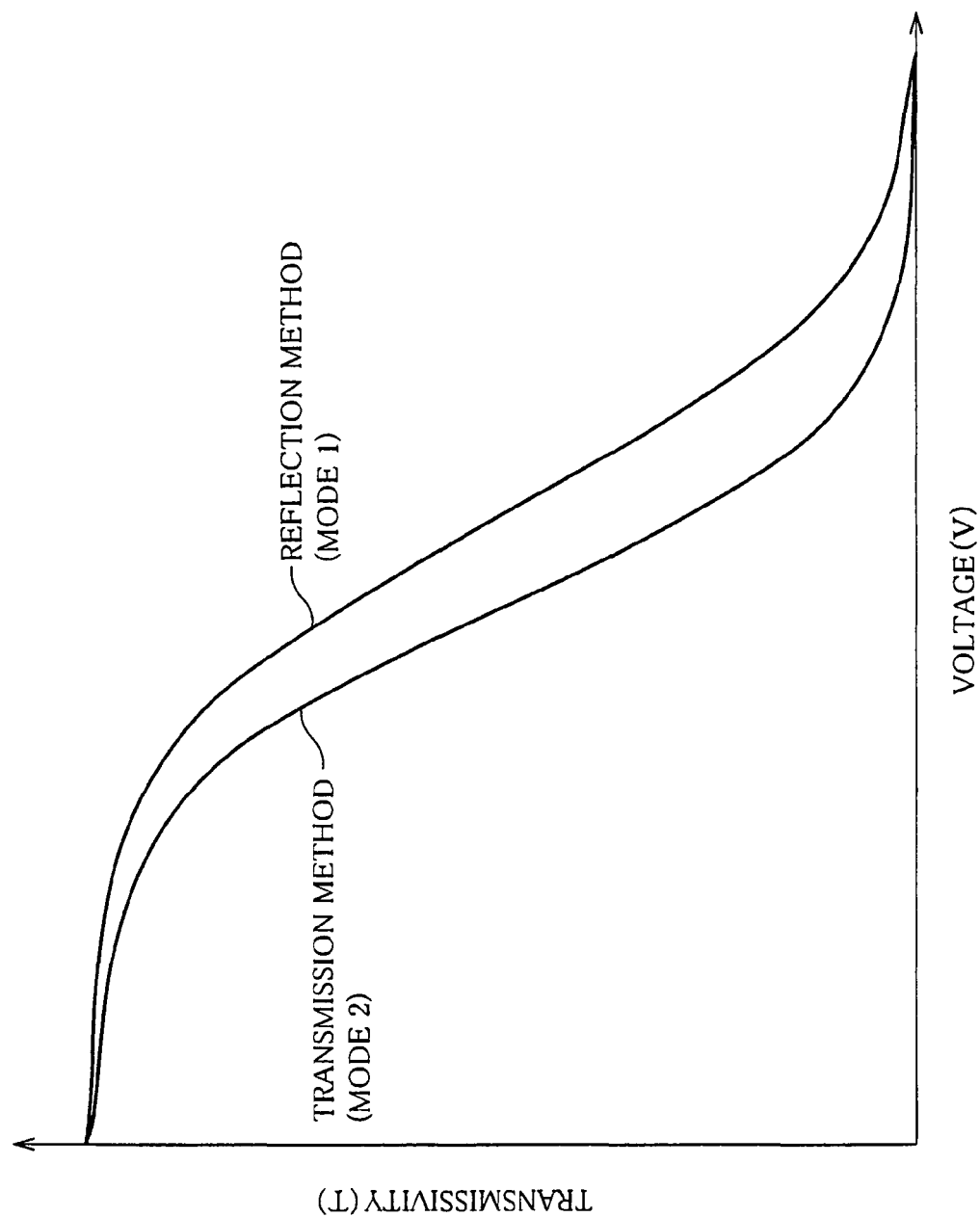
FIG. 11 is a graph showing relationship between an applied voltage and transmissivity of the transmission method and the reflection method in the conventional LCD.
Figure 12:
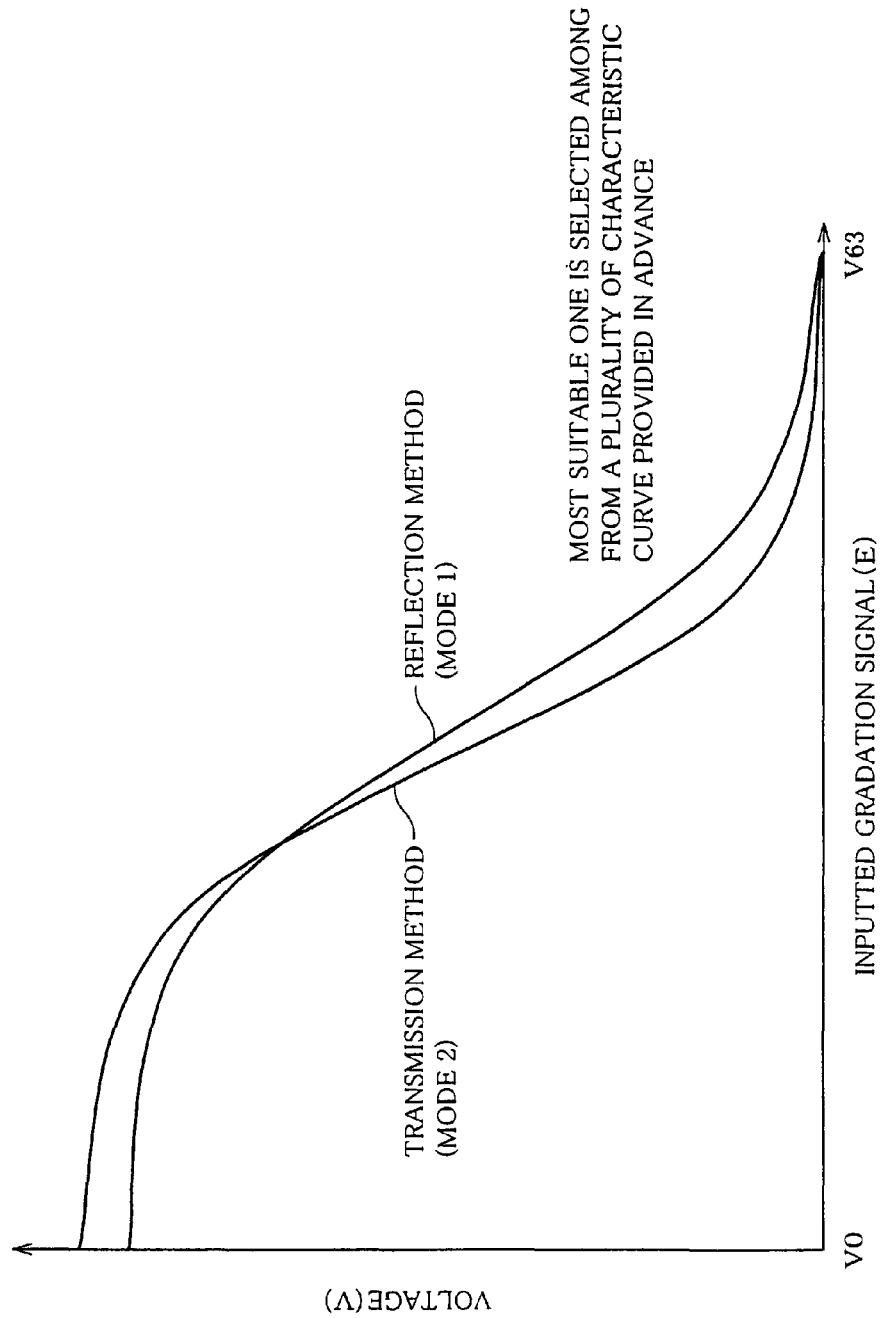
FIG. 12 is a graph illustrating relationship between an input gradation signal and an applied voltage of the transmission method and the reflection method in the conventional LCD.
Figure 13:
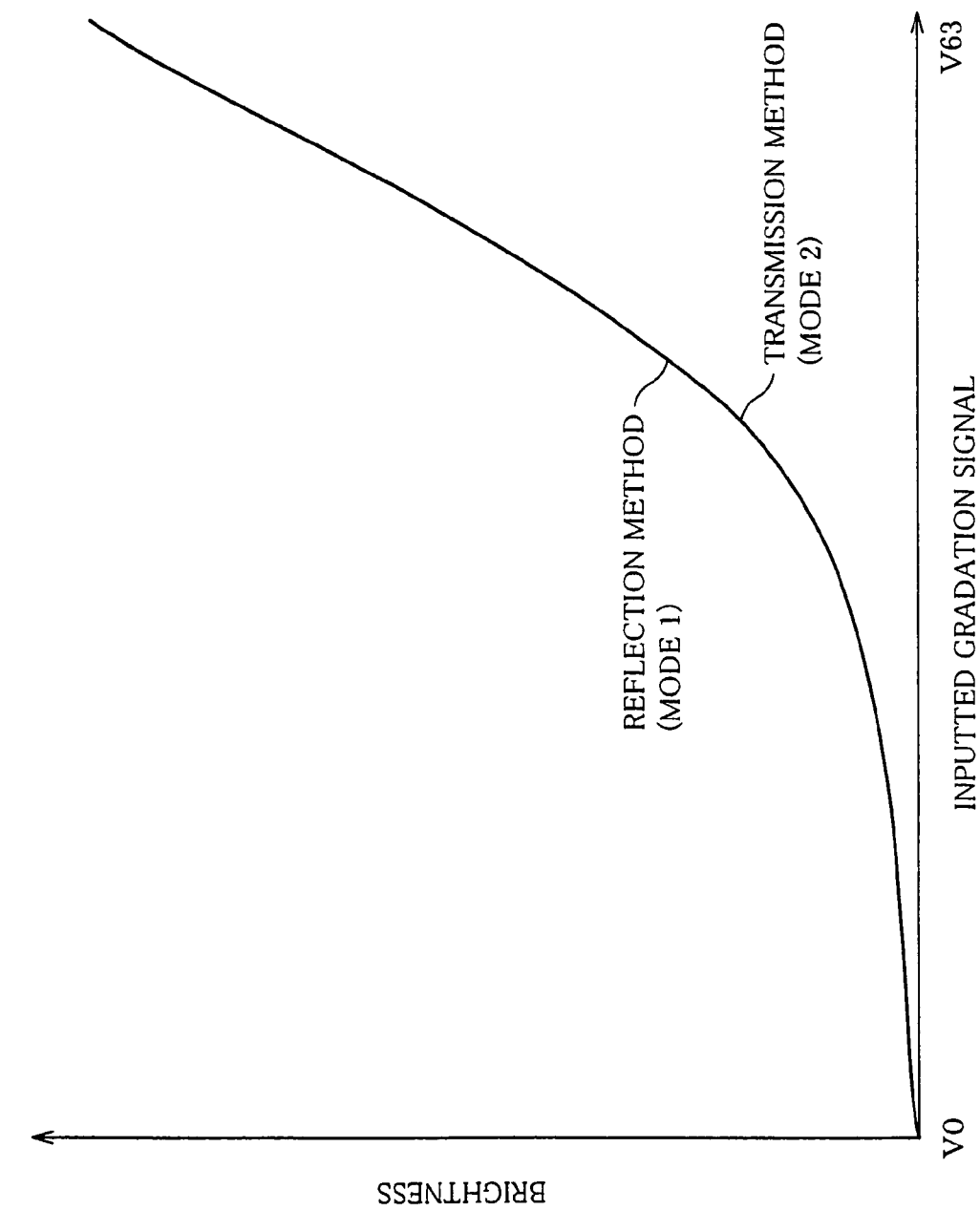
FIG. 13 is a graph illustrating an input gradation signal and brightness of the transmission method and the reflection method of an ideal LCD.
Figure 14:
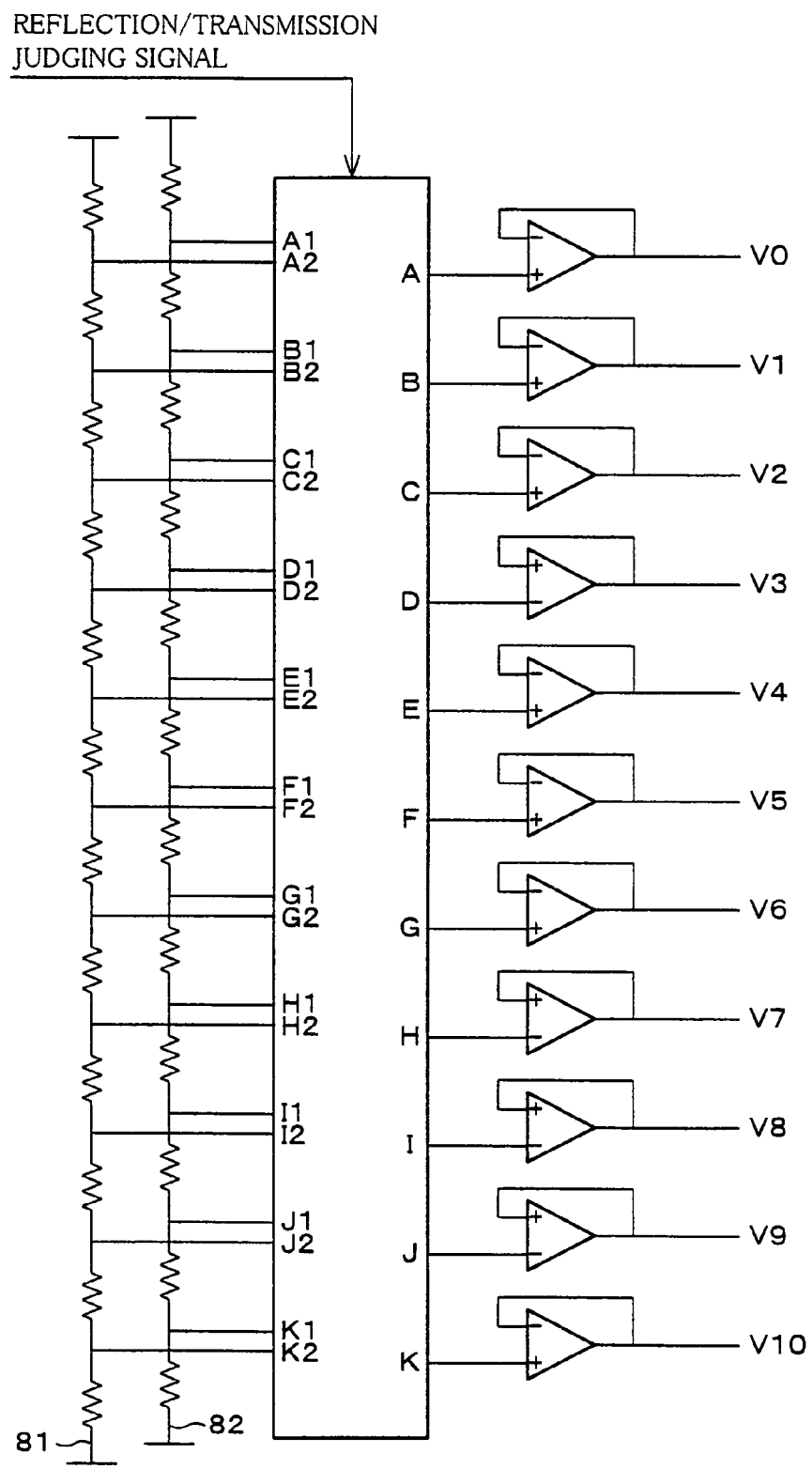
FIG. 14 is a block diagram illustrating an arrangement of a γ correction circuit of a another conventional LCD.
Figure 15:
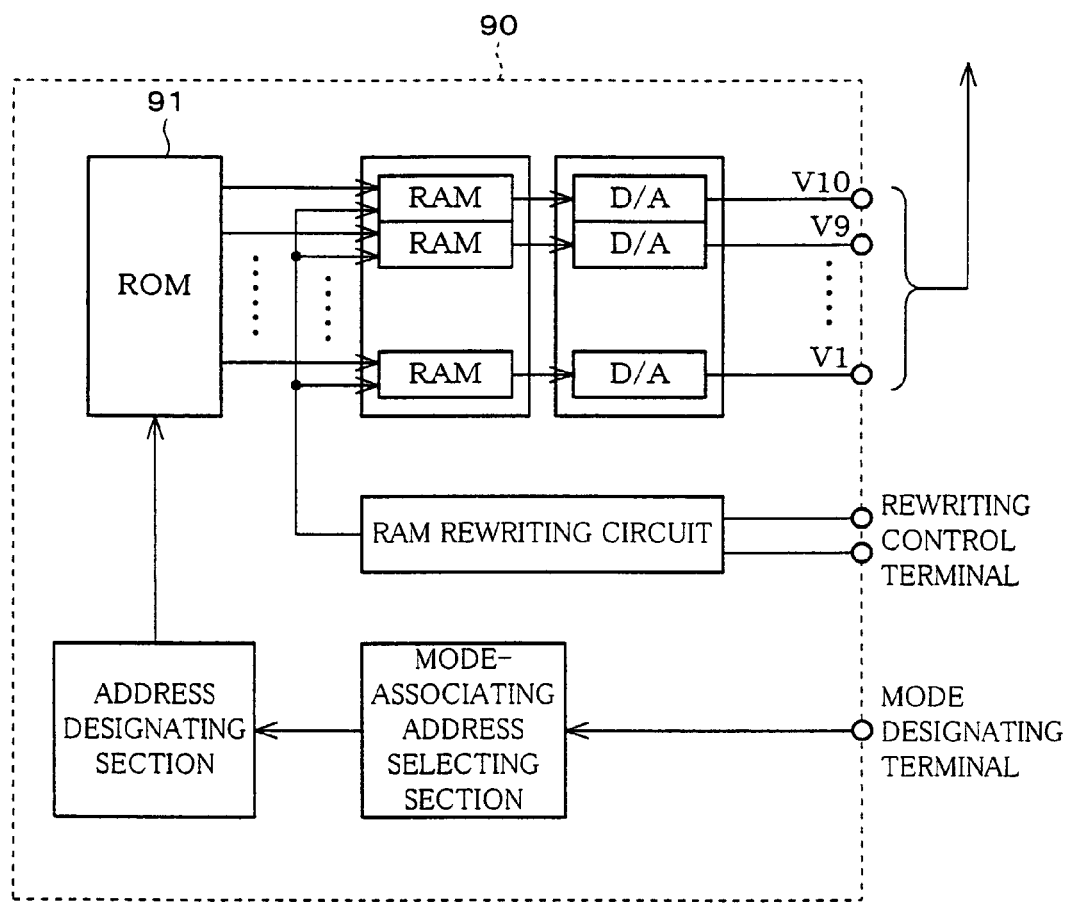
FIG. 15 is a block diagram illustrating an arrangement of a γ correction circuit of still another conventional LCD.

With this arrangement, it is possible to change the gradation characteristic as shown in FIG. 6, thereby attaining an output voltage most suitable for the input gradation signal.

As described above, because in reality it is not practical to have γ correction values respectively for each gradation signal, it is preferable to have several different γ correction values in the non-volatile memory 6, so that the most suitable one of the γ correction values is used.

As described above, in the LCD 10 of the present embodiment, the gradation reference potential generating circuit 20 is provided with a group of the output terminals 11 whose voltages are determined in accordance with the voltage division ratio of one ladder resistor 7, so as to output the gradation reference potentials respectively for gradations of a certain multiple of the required number of gradations, 64, for example, a 16 multiple of the required number of 64-gradation required.

Therefore, only one ladder resistor 7 is provided in this arrangement. Thus, compared with an arrangement in which a plurality of the ladder resistors 7 are provided, the gradation reference potential generating circuit 20 is smaller in size.

Moreover, the group of the output terminals 11 includes the output terminals 11 of the number corresponding to the number of the gradation reference potentials, that is, a certain multiple of the required number of gradations, 64, for example, a 16 multiple of 64-gradations required (in short, 1024-gradations). Therefore, outputted are the gradation reference potentials of more finely divided gradations levels than the sixty four gradation levels required. By selecting the gradation reference potentials among from the gradation reference potentials of such number, it is possible to attain accurate γ correction.

Moreover, the non-volatile memory 6, which is consist of a memory, designates the output terminals 11 that are suitable for the display modes, respectively for each of the 64-gradation levels required. Further, the selector 12 selects, among from the output terminals thus designated by the non-volatile memory 6, that output terminal 11 which corresponds to the input gradation signal, and applies a voltage via the thus selected output terminal 11 to the display panel 1.

Therefore, the LCD 10 is provided with the non-volatile memory 6 that is accessible via the command interface 4, so as to store in the non-volatile memory 6 the γ correction values that are respectively suitable for the plural display modes of the LCD 10.

As a result, it is possible to attain correct gradation display and improve the quality of the display image irrespective of whether the display is performed indoors or outdoors.

Therefore, it is possible to provided the LCD 10 in which a gradation signal-brightness characteristics of the respective display modes are very similar with high accuracy, in order to prevent the gradation display from being changed due to the switchover of the display modes.

Moreover, the memory in the LCD 10 of the present embodiment is non-volatile. Thus, content of the memory will not be erased by turning OFF the LCD 10.

Moreover, in the non-volatile memory 6, stored for each display mode is output terminal designating data that is respectively for the respective 64-gradation levels required in accordance with the display mode. By using the output terminal designating data, it is possible to easily designate the output terminal for a desired gradation level for each display mode (in other words, it is possible to easily set the output terminal for a desired gradation level for each mode).

Moreover, with the arrangement in which the non-volatile memory 6 is provided, it is possible to easily set γ characteristic to its optimum value without having a complicate circuit, even if the γ characteristic should be switched over for a display mode other than the display modes described above. Thus, the LCD 10 can have a very practical arrangement.

Compared with Japanese Publication for Unexamined Patent Application "Tokukai No. 2000-193936" (published on Jul. 14, 2000) discussed above, the LCD 10 of the present embodiment is different in that only one ladder resistor 7 for deciding the gradation characteristic is provided, the non-volatile memory 6 is provided, and the values of the output terminals 11 are controlled in accordance with the settings stored in the non-volatile memory 6. Therefore, in the LCD 10 of the present embodiment, switchover of the settings is also very easy because the non-volatile memory 6 is provided therein.

Therefore, it is possible to switch the settings easily in accordance with (a) a difference between a designed panel characteristic and an actual panel characteristic, (b) a change in panel characteristic due to a change in design, (c) and the like.

Moreover, in the LCD 10 of the present embodiment, in order to divide the power source voltage (VOH-VOL), the gradation reference potential generating circuit 30 is provided with two series, each of which includes two variable resistors and a ladder resistor 7 located between the two variable resistors, the ladder resister 7 outputting gradation reference potentials of the required number. Further, the gradation reference potential generating circuit 30 is provided with the non-volatile memory 6 in which the resistance value setting data is stored for each display mode, in order to set the resistance values of the variable resistors 15 to 18. In accordance with the resistance value setting data stored in the non-volatile memory 6, the resistance values of the variable resistors 15 to 18 are set. Therefore, by switching over the resistance value setting data stored in the non-volatile memory 6, it is possible to substantially attain arbitrary output of the gradation reference potentials.

Therefore, it is possible to provide the LCD 10 in which a gradation signal-brightness characteristics of the respective display modes are very similar with each other with high accuracy, in order to the gradation display from being changed due to the switchover of the display modes.

Moreover, in the LCD 10 of the present embodiment, the two sets of the ladder resistors 7 are respectively used for generating the positive gradation reference potentials and the negative gradation reference potentials. More specifically, for example, it is necessary in the LCD 10 that the positive gradation reference potential and the negative reference potential are applied.

In this point, the present embodiment is so arranged that two of two sets of the variable resistors 15 to 18, that is, the four variable resistors 15 to 18 are provided. Therefore, it is possible to generate the gradation reference potential of an arbitrary gradation level on generating the positive gradation reference potential and the negative gradation reference potential.

Therefore, it is possible to downsize the gradation reference potential generating circuit 30, while requiring only a very small amount of information to be written in the non-volatile memory 6.

Note that it is necessary to have a large number of input points of the gradation compensation voltages (in the embodiment, 10 points; however, in reality, 20 points (two times of the embodiment) is necessary for +wring/−writing) for smoothly switching over the gradation characteristic. On the contrary, the LCD 10 of the present embodiment requires only two points (for both +writing/−writing, 4 points are necessary) of data, thereby only requiring a very small amount of information to be written in the non-volatile memory 6.

As described above, a display apparatus of semi-transmissive type (semi-transmissive display apparatus) of the present invention for performing both reflective display and transmissive display, a display mode of the reflective display and a display mode of the transmissive display being different in relationship between an applied voltage and transmissivity or relationship between the applied voltage and reflectivity, is so arranged as to include (a) gradation reference potential generating means including two series of two variable resistors and a ladder resistor located between the two variable resistors, the ladder resistor outputting gradation reference potentials of a required number of gradation levels, each of the series dividing a power source voltage, the gradation reference potential generating means including a memory for storing therein resistance value setting data for each display mode, the resistance value setting data being for setting resistance values of the variable resistors.

In the above arrangement, the gradation reference potential generating means is provided with two series of two variable resistors and a ladder resistor located between the two variable resistors, (each series including two variable resistors and one ladder resistor), the ladder resister outputting gradation reference potentials of a required number of gradation levels, each of the series dividing a power source voltage. Further, the gradation reference potential generating means includes a memory for storing therein resistance value setting data for each display mode, the resistance value setting data being for setting resistance values of the variable resistors. With this arrangement, the resistance values of the variable resistors are set in accordance with the resistance value setting data stored in the memory. Therefore, by switching over the resistance value setting data stored in the memory, it is possible to substantially attain arbitrary output of the gradation reference potentials.

Therefore, it is possible to provide a display apparatus capable of attaining very similar gradient signal-brightness characteristics for respective display modes with high accuracy, in order to prevent a gradient display from being changed due to switchover of the display modes.

Moreover, the display apparatus of the present invention, having the above arrangement, may be so arranged that the memory is non-volatile.

According this arrangement, the content in the memory will not be erased even if the display apparatus is turned OFF.

Furthermore, the display apparatus of the present invention, having the aforementioned arrangement, may be so arranged that the two ladder resistors respectively generate a positive gradation reference potential and a negative gradation reference potential.

In this arrangement, the two ladder resistors are respectively used to generate the positive gradation reference potential and the negative gradation reference potential. For example, in an LCD, it is necessary to apply positive gradation reference potential and a negative gradation reference potential.

In this point, the present invention is so arranged that two of two sets of the variable resistors, that is, the four variable resistors are provided in total. Therefore, it is possible to generate the gradation reference potential of an arbitrary gradation level on generating the positive gradation reference potential and the negative gradation reference potential.

Therefore, it is possible to downsize the gradation reference potential generating means, while requiring only a very small amount of information to be written in the non-volatile memory.

Moreover, a display apparatus of semi-transmissive type of the present invention for performing both reflective display and transmissive display, a display mode of the reflective display and a display mode of the transmissive display being different in relationship between an applied voltage and transmissivity or relationship between the applied voltage and reflectivity, is so arranged as to include (a) gradation reference potential generating means including a group of output terminals whose voltages are determined in accordance with a voltage division ratio of one ladder resistor so as to output gradation reference potentials of a number greater than a required number of gradations; (b) output terminal designating means including a memory for designating, among from the output terminals, an output terminal for each of the gradation of the required number, in accordance with the display modes; and (c) selecting means for selecting an output terminal that corresponds to an input gradation signal, among from the output terminals designated by the output terminal designating means, and for applying a voltage via the thus selected output terminal to a display screen.

In this arrangement, the gradation reference potential generating means includes a group of output terminals whose voltages are determined in accordance with a voltage division ratio of one ladder resistor so as to output gradation reference potentials of a number greater than a required number of gradations.

Thus, only one ladder resistor is provided in this arrangement. Therefore, the size of the gradation reference potential generating means is not greater than in a case where a plurality of ladder resistors are provided.

Moreover, the number of the output terminals in the group is greater than the required number of the gradations, in order to be able to supply the gradation reference potentials of the number greater than the required number of gradations (gradation levels). Therefore, outputted are the gradation reference potentials of more finely divided gradations levels than the gradations (gradation levels) required. By selecting the gradation reference potentials among from the gradation reference potentials of such a large number, it is possible to attain accurate γ correction.

Furthermore, the gradation reference potential generating means may be so arranged as to include a group of output terminals for outputting gradation reference potentials of an N multiple of a required number of gradations, where N is an integer not less than 2.

With this arrangement, the gradation reference potentials of the N multiple of the required number of the gradations are provided where N is an integer not less than 2. Therefore, outputted are the gradation reference potentials of more finely divided gradations levels than the gradations (gradation levels) required. By selecting the gradation reference potentials among from the gradation reference potentials of such a large number, it is possible to attain accurate γ correction.

Moreover, the output terminal designating means, which includes a memory, designates the output terminals that are suitable for the display modes, respectively for each of the gradation levels (gradations) of the required number. Further, the selector selects, among from the output terminals thus designated by the output terminal designating means, that output terminal which corresponds to the input gradation signal, and applies a voltage via the thus selected output terminal to the display panel.

Therefore, the display apparatus is provided with, for example, a non-volatile memory that is accessible via the command interface, so as to store in the non-volatile memory the γ correction values that are respectively suitable for the plural display modes of the display apparatus.

As a result, correct gradation display is attained, and it becomes possible to improve the quality of the display image regardless of whether the display is performed indoors or outdoors.

Therefore, it is possible to provide a display apparatus capable of attaining very similar gradient signal-brightness characteristics for respective display modes with high accuracy, in order to prevent a gradient display from being changed due to switchover of the display modes.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display apparatus of semi-transmissive type for performing both reflective display and transmissive display, a display mode of the reflective display and a display mode of the transmissive display being different in relationship between an applied voltage and transmissivity or relationship between the applied voltage and reflectivity, the display apparatus comprising:

gradation reference potential generating means including a group of output terminals whose voltages are determined in accordance with a voltage division ratio of one ladder resistor, so as to output gradation reference potentials of a number greater than a required number of gradations;

output terminal designating means including a memory for designating, among from the output terminals, an output terminal for each of the gradation of the required number, in accordance with whether the display apparatus is in the reflective display mode or the transmissive display mode; and selecting means for selecting an output terminal that corresponds to an input gradation signal, among from the output terminals designated by the output terminal designating means and for applying a voltage via the thus selected output terminal to a display screen, wherein the memory stores therein a first combination of the output terminals for use in the transmissive display mode, the number of the output terminals in the first combination corresponding to the required number of gradations; and a second combination of the output terminals for use in the reflective display mode, the number of the output terminals in the second combination corresponding to the required number of gradations, the first and second combinations being different from each other.

2. The display apparatus as set forth in claim 1, wherein the memory is non-volatile, and stores therein resistance value setting data for each display mode, the resistance value setting data being for setting resistance values of the variable resistors.

3. The display apparatus as set forth in claim 1, wherein the gradation reference potential generating means includes a group of output terminals for outputting gradation reference potentials of an N multiple of a required number of gradations, where N is an integer not less than 2.

* * * * *